Sept. 1, 1964  L. O. CARLSEN ETAL  3,146,551
CUTTER SHARPENING MACHINE
Filed Oct. 18, 1960  9 Sheets-Sheet 1

INVENTORS
LEONARD O. CARLSEN
BY THOMAS A. DEPREZ
ATTORNEY

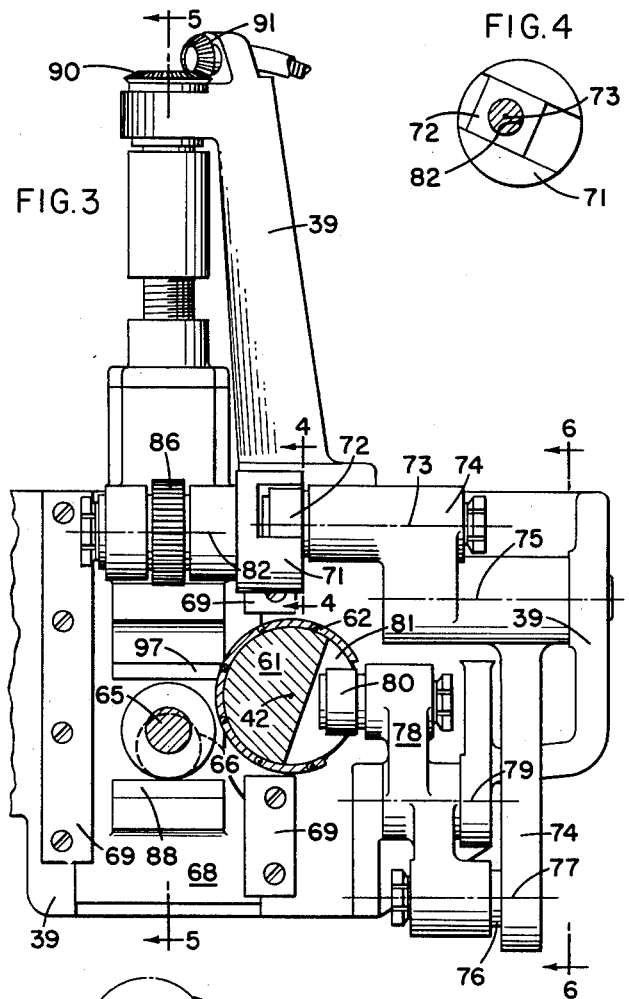
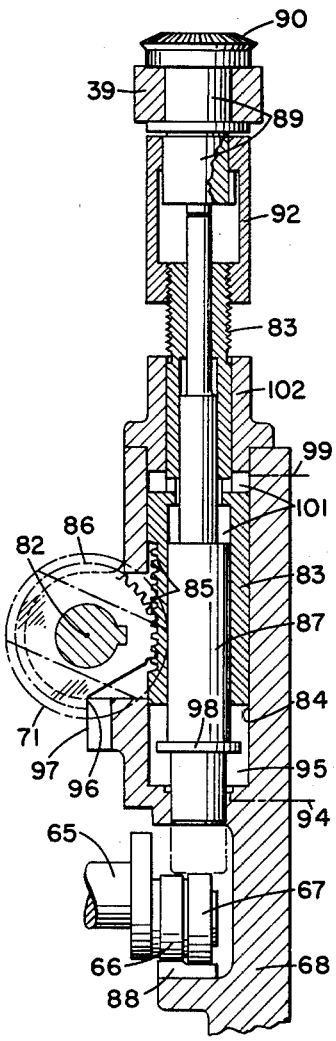
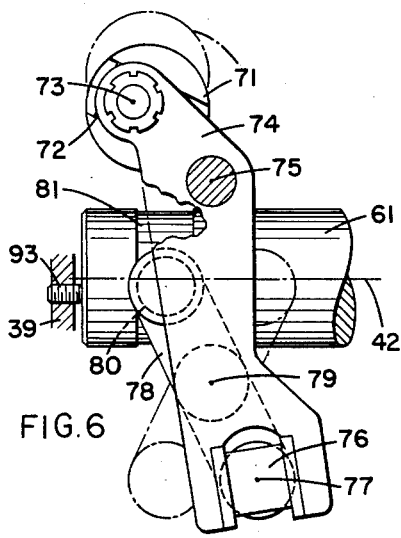
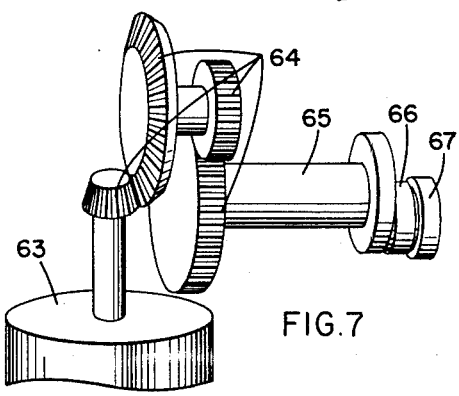

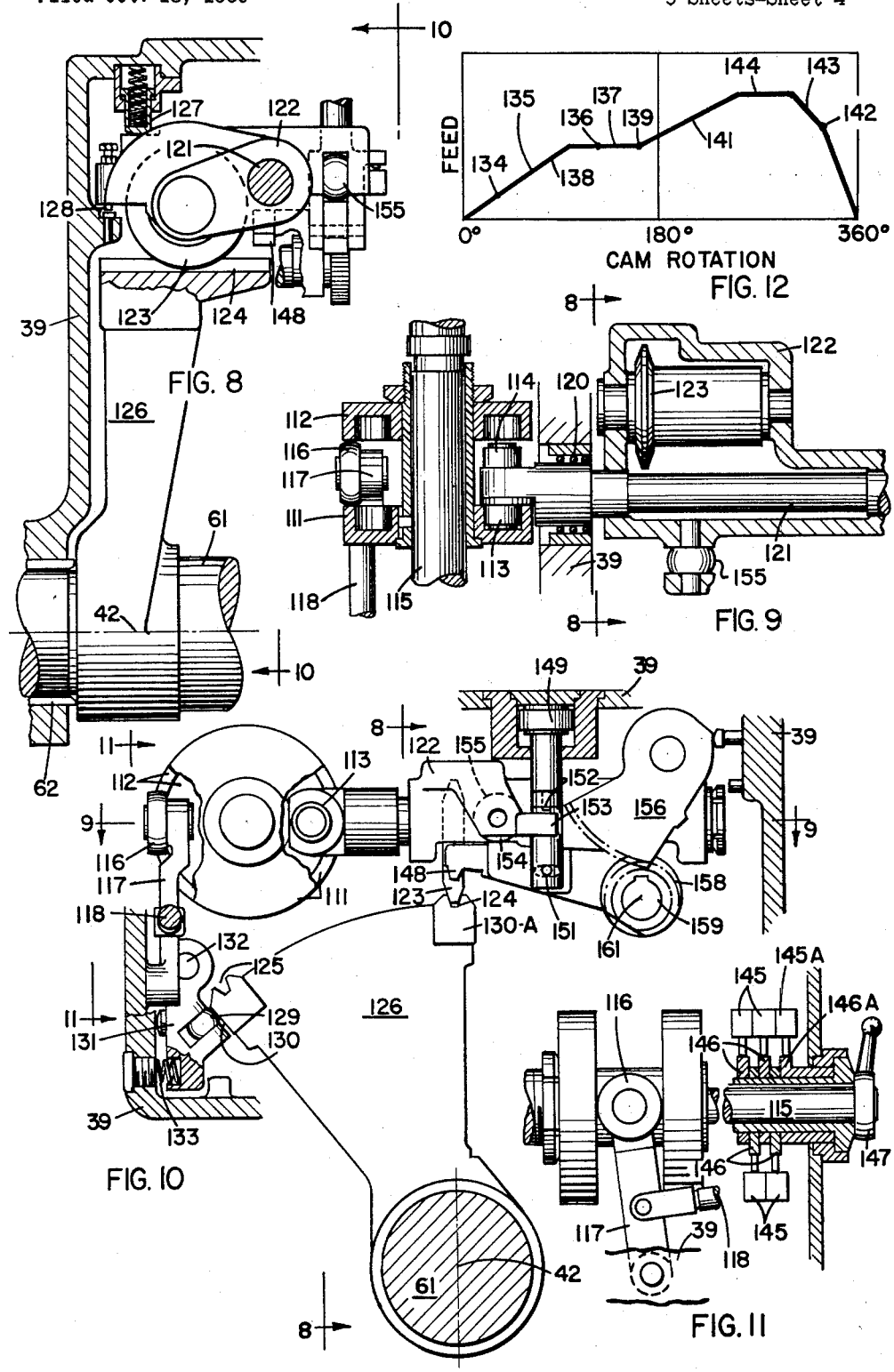

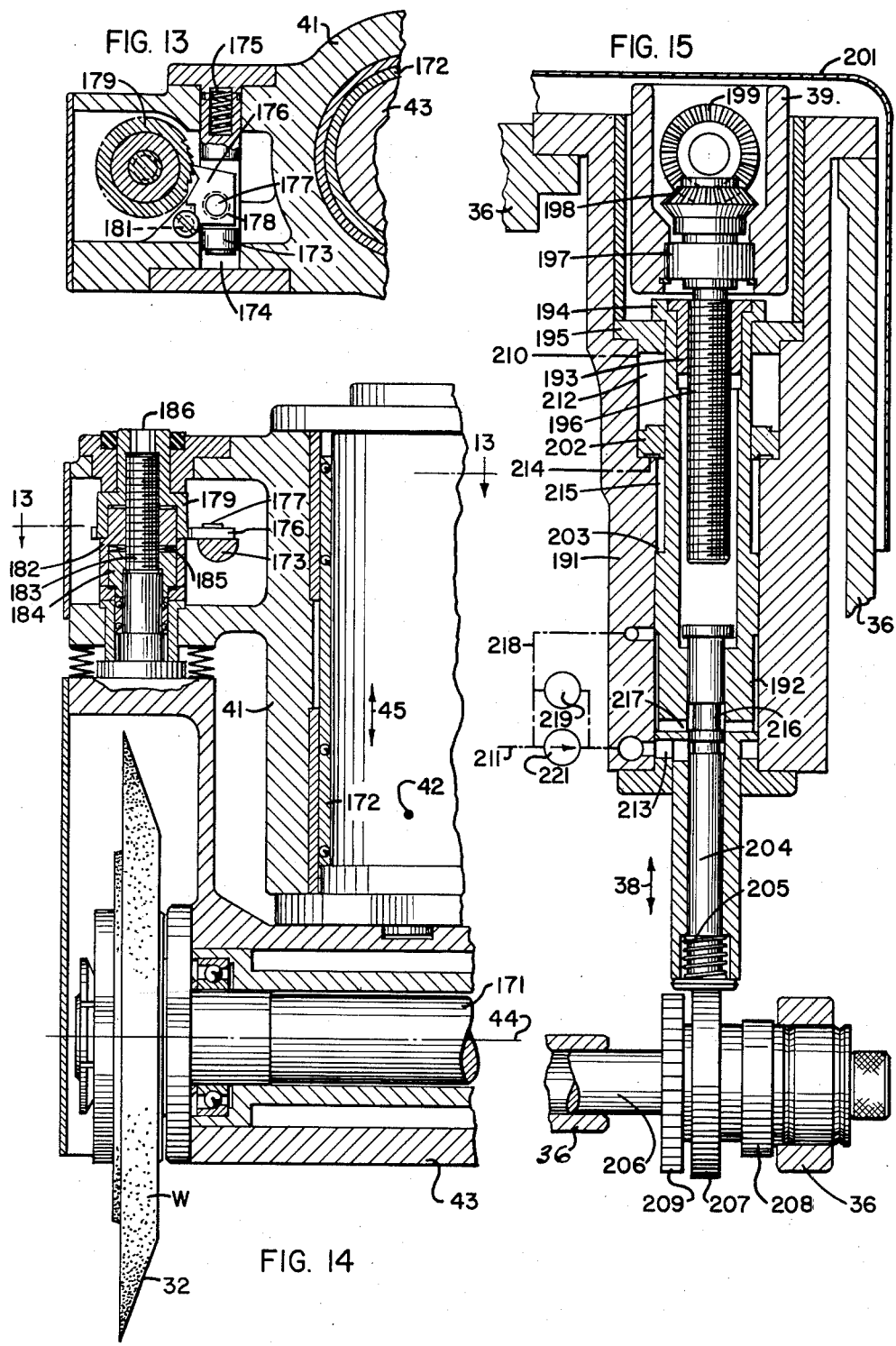

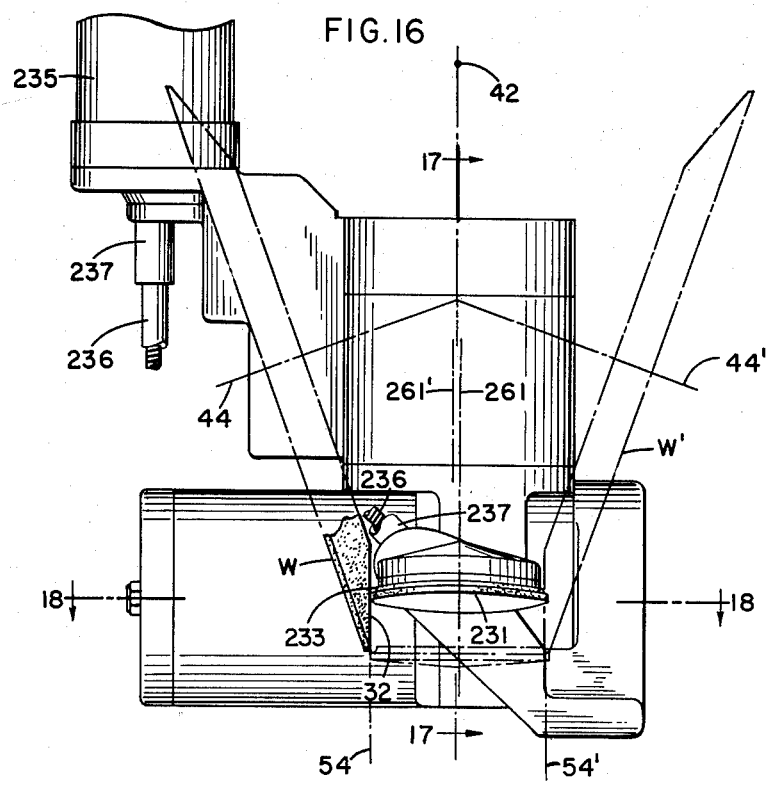
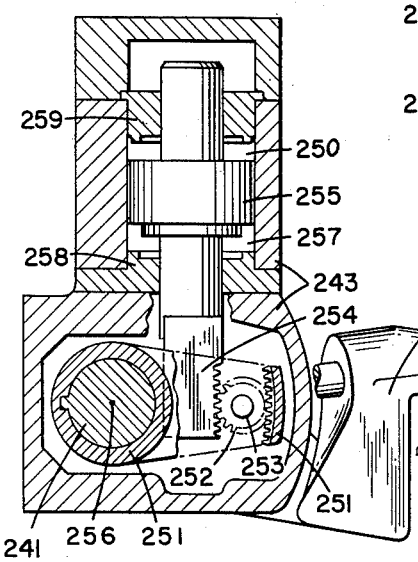
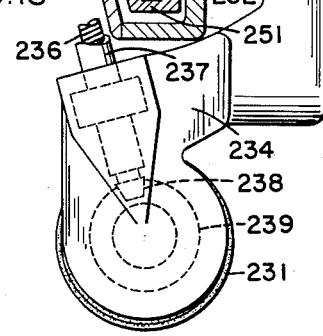

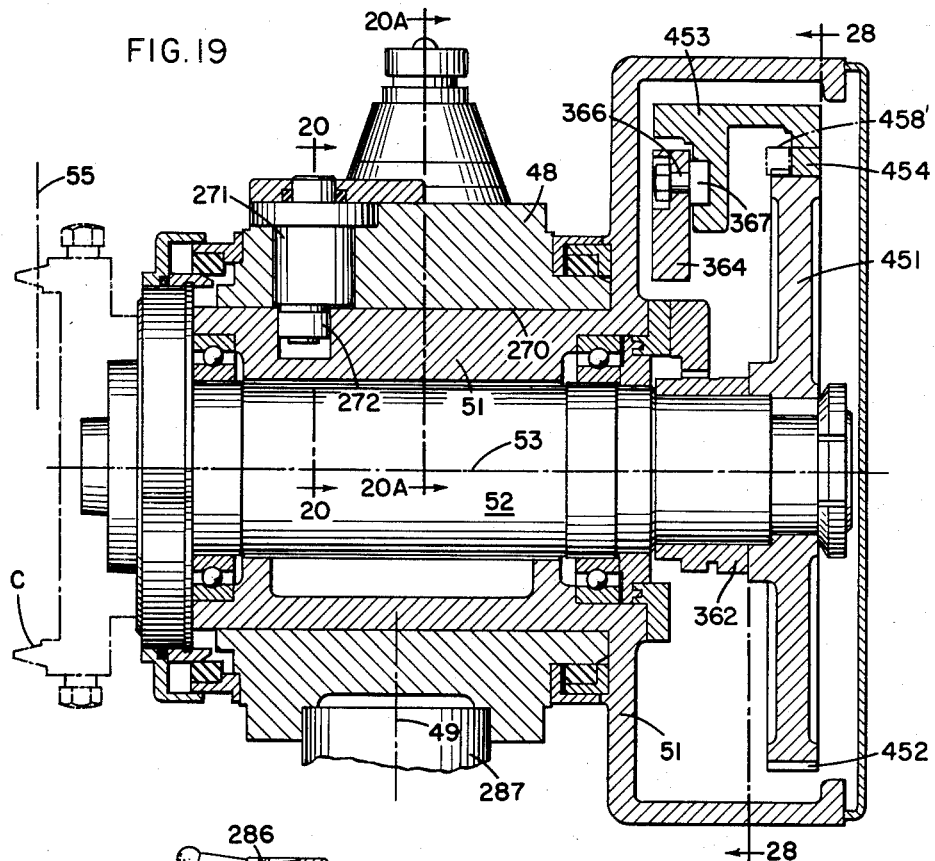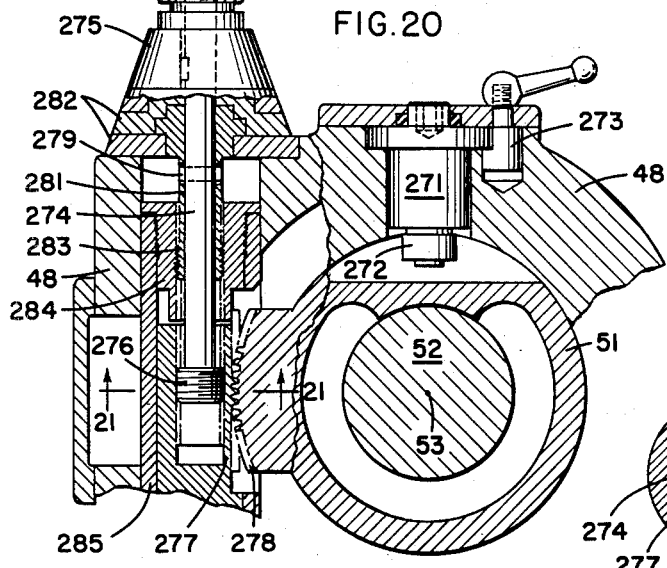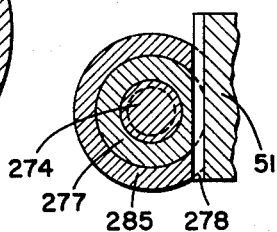

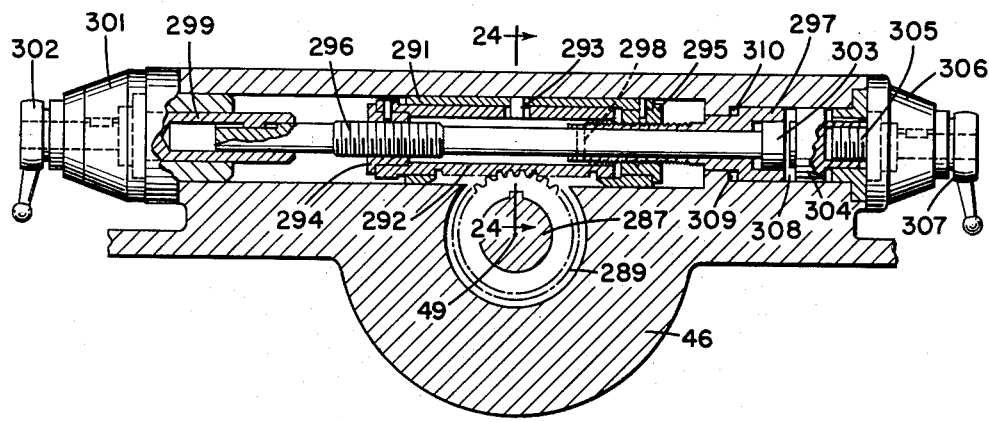
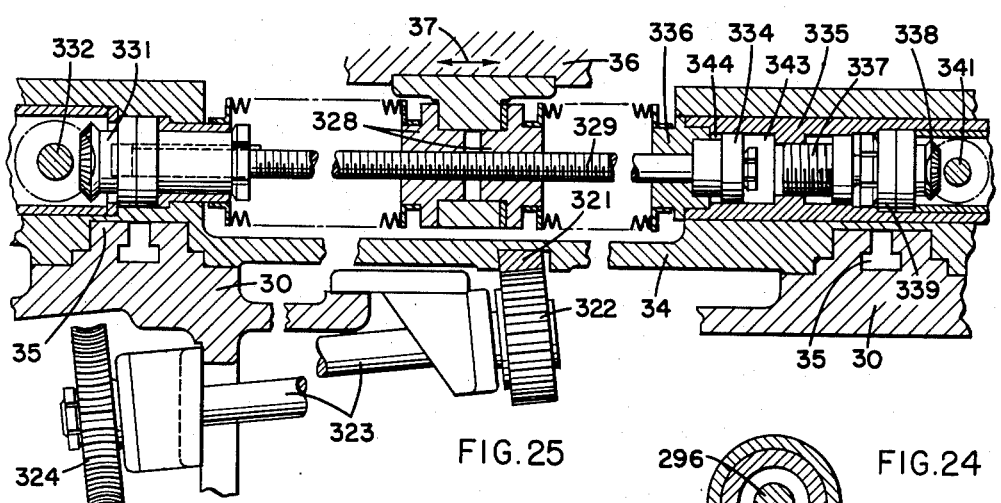
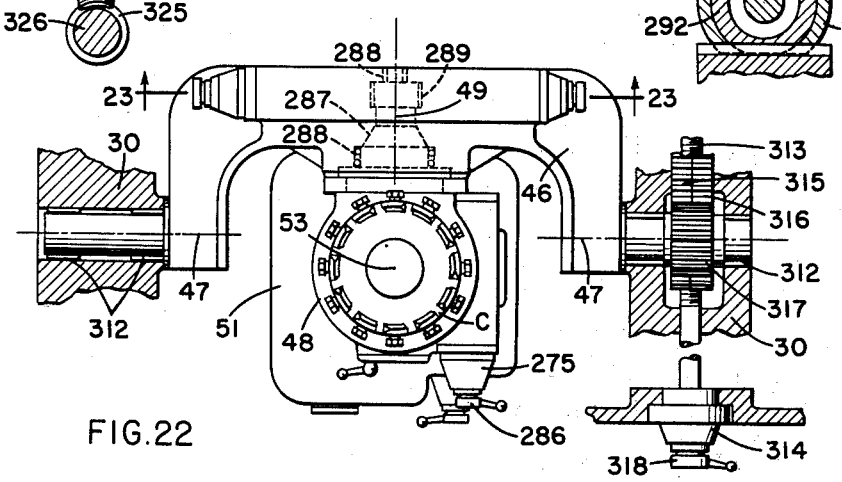

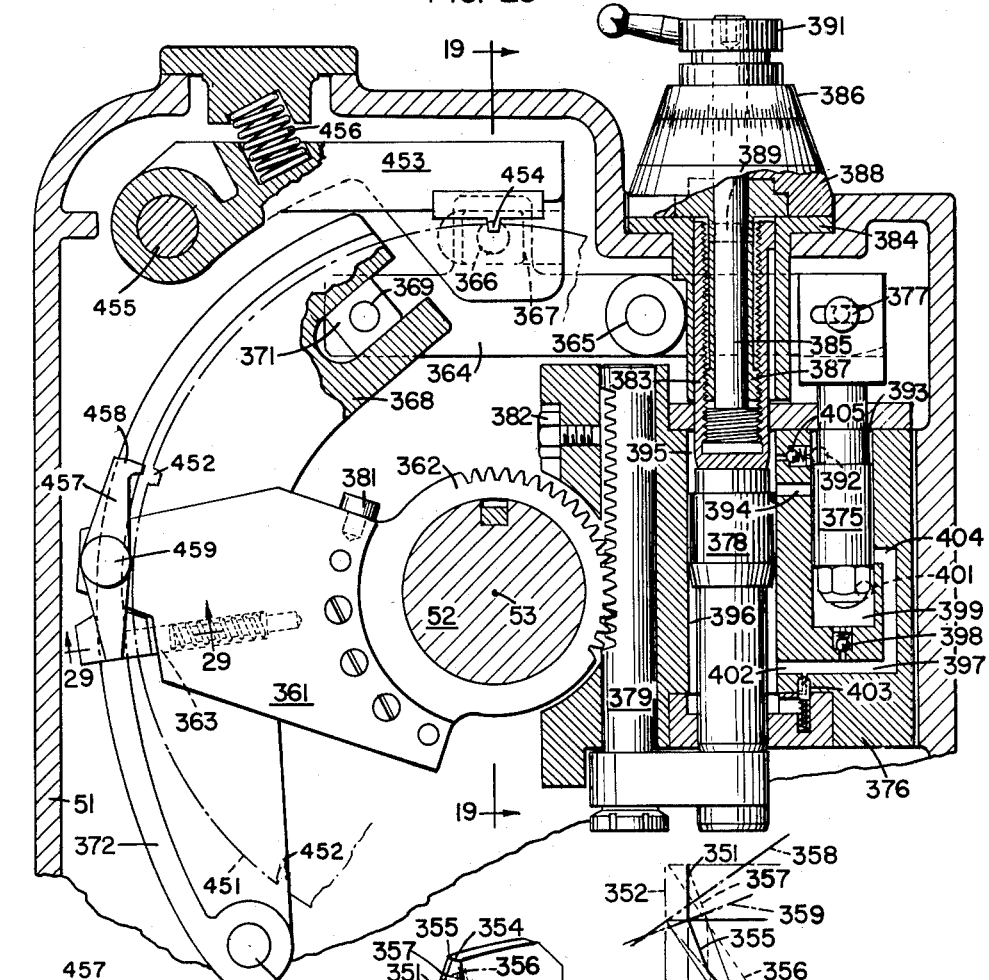
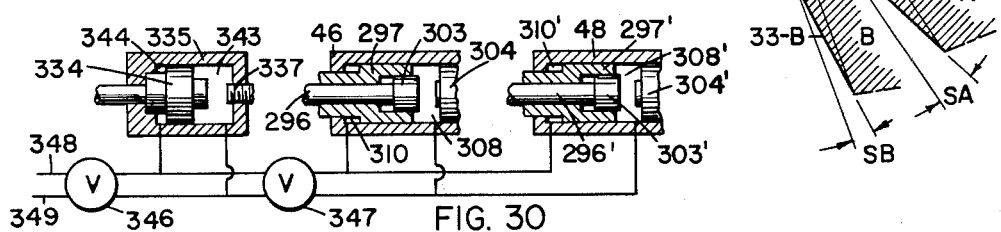

United States Patent Office 3,146,551
Patented Sept. 1, 1964

3,146,551
CUTTER SHARPENING MACHINE
Leonard O. Carlsen and Thomas A. Deprez, Rochester, N.Y., assignors to The Gleason Works, Rochester, N.Y., a corporation of New York
Filed Oct. 18, 1960, Ser. No. 63,414
26 Claims. (Cl. 51—34)

The present invention relates to an improved cutter sharpening machine, especially but not exclusively for the sharpening of milling cutters for gears and toothed clutches.

One object of the invention is such a machine adapted for rapid and facile readjustment or relative repositioning of the grinding wheel employed for sharpening and the cutter undergoing sharpening to enable the sharpening faces of the cutter blades to be ground in two different planes. By such double-angle sharpening the entire face of the blade may first be ground in one plane to the depth necessary to remove scratches, nicks and pits, and then only the marginal portion of the face, along the cutting edge, may be lightly reground in a different plane to improve the surface and to remove burrs along the edge resulting from the primary sharpening, and also to obtain more accurate blade spacing.

Another primary object is an arrangement of the machine components in a manner which permits the sharpening to be carried out with great accuracy. This arrangement includes means whereby the spindle on which the cutter is supported, and which has the angular adjustments to accommodate cutters of different types and sizes, is additionally adjustable in the direction of its axis in order to compensate for changes in the height of the cutter blades due to repeated resharpening. Such axial adjustment makes possible the set-up and adjustment of the machine to pre-calculated settings based on the design dimensions of the cutter and the desired blade sharpening angles. The machine arrangement also includes means for effecting the feed motion of the grinding wheel, i.e. the motion in a direction substantially perpendicular to the sharpening plane, to be an angular motion about the same axis along which the back and forth stroking motion of the wheel occurs.

Figure 1:
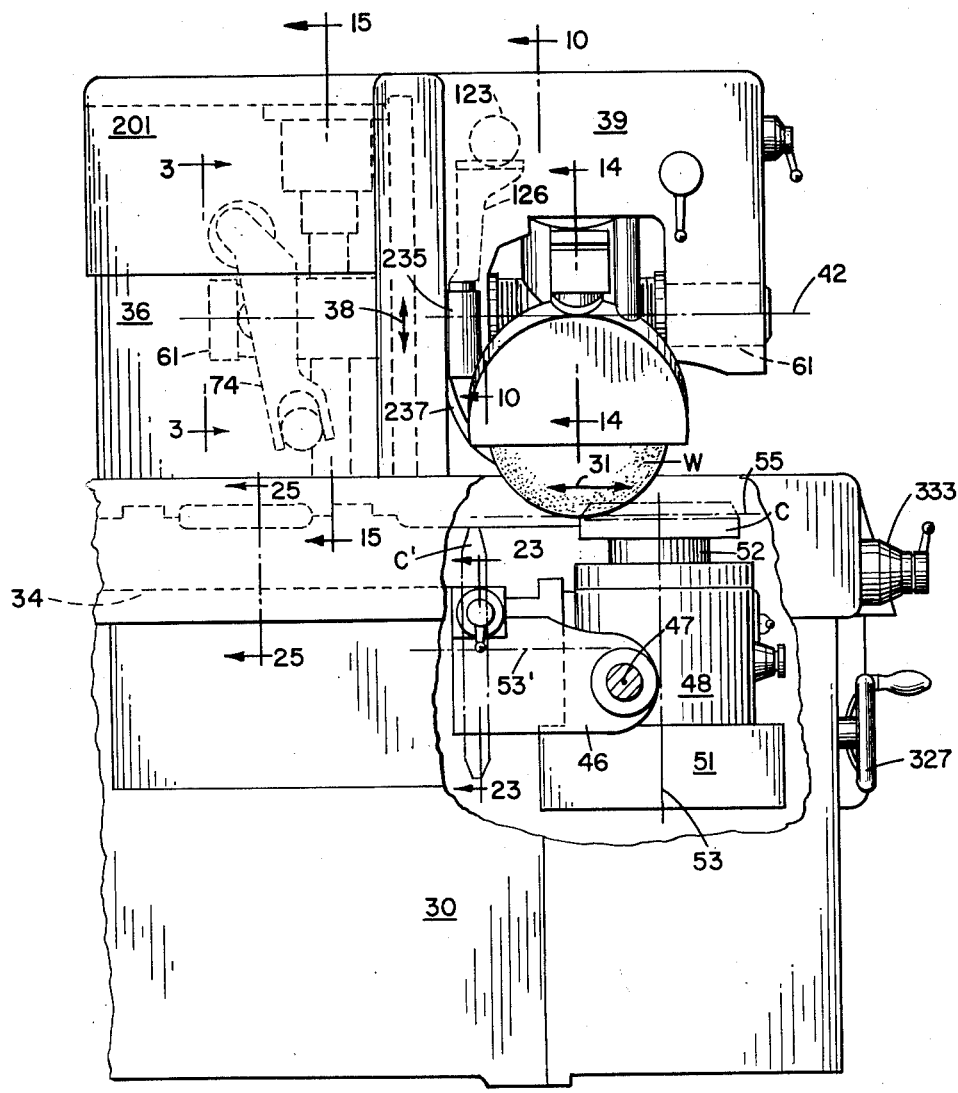
Figure 2:
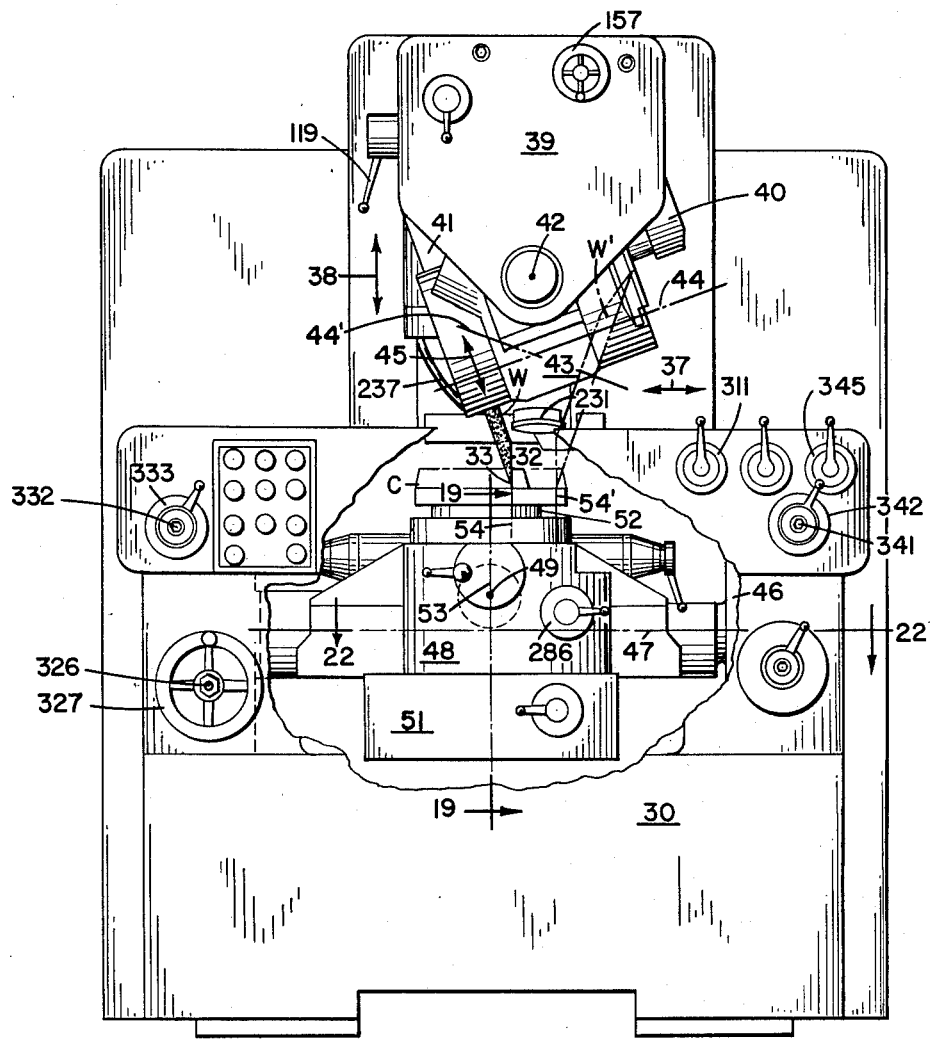

The foregoing and other objects and advantages will appear from the following description of the preferred embodiments of the invention shown in the accompanying drawings, wherein:

FIGS. 1 and 2 are respectively side and front views of the machine;
FIG. 3 is a view of the wheel stroking mechanism as viewed in plane 3—3 of FIG. 1;
FIG. 4 is a detail section in plane 4—4 of FIG. 3;
FIG. 5 is a sectional view in plane 5—5 of FIG. 3;
FIG. 6 is a detail of a lever mechanism as viewed in plane 6—6 of FIG. 3;
FIG. 7 is a diagram of the drive means for the wheel stroking mechanism;
FIG. 8 is a vertical section through the wheel feed mechanism, taken approximately in plane 8—8 of FIGS. 9 and 10;
FIG. 9 is a horizontal section in plane 9—9 of FIG. 10;
FIG. 10 is a vertical section approximately in plane 10—10 of FIGS. 1 and 8;
FIG. 11 is a detail as viewed in plane 11—11 of FIG. 10;
FIG. 12 is a wheel feed diagram;
FIG. 13 is a section in plane 13—13 of FIG. 14;
FIGS. 14 and 15 are vertical sections respectively in planes 14—14 and 15—15 of FIG. 1;
FIG. 16 is a front view of the wheel dresser mechanism, parts of which appear on a smaller scale in FIGS. 1 and 2;
FIGS. 17 and 18 are sectional views taken respectively in planes 17—17 and 18—18 of FIG. 16;
FIG. 19 is a sectional view through the cutter head, taken in planes 19—19 of FIGS. 2 and 28;
FIG. 20 is a sectional view in planes 20—20 and 20A—20A of FIG. 19;
FIG. 21 is a detail section in plane 21—21 of FIG. 20;
FIG. 22 is a plan view of the cutter supporting structure partly in section in plane 22—22 of FIG. 2;
FIG. 23 is a sectional view in plane 23—23 of FIGS. 1 and 22;
FIG. 24 is a detail section taken in plane 24—24 of FIG. 23;
FIG. 25 is a vertical section in plane 25—25 of FIG. 1;
FIG. 26 is a perspective view of a face mill cutter blade;
FIG. 27 is a plan view of a fragment of the cutting point of the blade, and related fragmentary sections in planes perpendicular to the sharpening faces of the blades;
FIG. 28 is a sectional view of the indexing mechanism taken in plane 28—28 of FIG. 19;
FIG. 29 is a detail in plane 29—29 of FIG. 28; and,
FIG. 30 is a schematic view of a modified hydraulic set-over means for use in double-angle sharpening.

Referring primarily to FIGS. 1 and 2, the machine comprises a frame 30 on which a frusto-conical grinding wheel W is mounted for reciprocation longitudinally of the frame, as indicated by arrow 31, to cause its conical face 32 to traverse the sharpening face 33 of a blade of a cutter C which also is supported by the frame. The mounting for the wheel includes a slide 34 adjustable longitudinally on the frame, along T-slotted ways 35, FIG. 25. A column 36 is adjustable on the slide, laterally of the frame, as indicated by arrows 37 in FIGS. 2 and 25. Movable vertically on the column, as indicated by arrow 38 in FIGS. 1 and 2, there is a bracket 39 on which a wheel head support 41 is mounted for reciprocation 31 and also for angular adjustment and feed motion about axis 42. A wheel head 43 is adjustable on support 41 in a direction perpendicular to both axis 42 and wheel rotation axis 44, as indicated by arrow 45. A motor 40 carried by the head 43 drives the spindle of the grinding wheel through an endless belt, not shown.

A cutter head bracket 46, FIGS. 1, 2 and 22, is mounted on the frame, beneath the grinding wheel, for angular adjustment about transverse axis 47; and to the bracket a cutter head 48 is pivotally adjustable, about axis 49 which is perpendicular to axis 47. A housing 51, for the spindle 52 which supports the cutter C to be sharpened, is adjustable in the head 48 in the direction of the spindle axis, 53, and also angularly about that axis.

The machine is adapted to sharpen either right or left hand cutters by mounting the grinding wheel either in the position shown at W in full lines or at W' in broken lines in FIG. 2, and by adjusting the wheel head and support, 43, 41, about axis 42 so that the wheel axis is in position 44 or 44'. In these respective positions the conical face 32 of the wheel traverses sharpening planes 54 and 54' as the wheel strokes back and forth in direction 31, these planes being parallel to axis 42. In both cases the periphery of the wheel traverses a plane, designated 55, which is perpendicular to planes 54, 54' and parallel to axis 42.

The machine is adapted to sharpen either a face mill cutter C or a disc mill cutter C', FIG. 1, by adjusting the cutter head and bracket, 48, 46, usually through ninety degrees, to bring the cutter spindle axis into either the perpendicular or parallel relation to the axis 42 in which it is shown respectively at 53 and 53' in FIG. 1. Cutters of the same design are preferably always sharpened with the plane containing the tips of the cutter blades in the same position relative to the machine frame. To accommodate changes of the cutter tip plane resulting from repeated sharpening back of the cutters, which usually are relieved radially in the case of disc mills and axially in the case of face mills, the spindle housing 51 is adjusted along axis 53 in head 48. Thus, in the case of a face mill cutter of any one particular design, the tip plane of the cutter will always be brought to the same plane perpendicular to the cutter spindle axis, i.e. to the same distance from axis 49. This adjustment is preferably made with the aid of a gage, not shown, which is adapted to rest on the cutter head 48 and touch the tip of a cutter blade. By reason of this adjustment the other machine settings, except adjustment to compensate for changes in the diameter of the grinding wheel W, may always be the same for cutters of one design, and hence may be pre-calculated.

Adjustment 38 of the bracket 39 upon column 36 is employed to bring the periphery of the wheel into tangency with the plane 55, and the bracket is retracted in this same direction, but to different positions to (a) withdraw the wheel to permit blade-to-blade indexing of the cutter and (b) position the wheel for dressing and also for providing clearance for mounting and removing of the cutter. The vertical position to which plane 55 is adjusted depends upon the position and the height of the sharpening face 33 of the cutter, when the latter is in sharpening position, and is conveniently made after the cutter has been mounted and adjusted on the machine, preferably with the aid of a suitable gage applied between the cutter blade and the tip of the wheel W when the latter has been raised to indexing position. The sharpening offset adjustment of face mill cutters and the sharpening angle of disc mill cutters are established by adjustment of sharpening plane 54 or 54' in a direction perpendicular thereto, by adjustment 37 of the column. The sharpening angle of a face mill cutter, or the sharpening offset adjustment of a disc mill cutter, is established by tilting the cutter axis 53 relative to the sharpening plane 54 or 54' by adjusting the cutter head 48 about axis 49. Feed motion of the wheel, to grind successive layers of stock from the cutter blade on successive wheel passes, is by pivotal motion of the wheel head and support 43, 41, about axis 42, and is concluded when the conical surface of the wheel reaches the sharpening plane. The adjustment of the cutter spindle housing 51 in head 48 angularly about axis 53 enables the sharpening faces 33 of the cutter to be brought to the sharpening plane 54 or 54'.

The mechanism for effecting reciprocation 31 of the wheel W relative to bracket 39 is shown in FIGS. 3 to 7. This reciprocation is enabled by the wheel head support 41 being affixed to a shaft 61 journaled on axis 42 in ball sleeve bearings 62, one of which is shown in FIGS. 3 and 8, in bracket 39. The motor 63 which effects the reciprocation is preferably of adjustable speed and through reduction gearing 64 drives a crank shaft 65 on whose crank pin are coaxial rollers 66 and 67 which act to reciprocate vertically an assembly comprising a slide 68, guided by gibs 69, and a diametrically slotted disc 71. A block 72 slidable in the slot of the disc is pivoted on axis 73 to a lever 74 which is fulcrumed to bracket 39 on axis 75. The opposite end of the lever has a slot in which a block 76 is slidable, this block being pivoted on axis 77 to a second lever, 78, that is fulcrumed on the bracket 39 on axis 79. Lever 78 carries a roller 80 engaging in a transverse slot 81 in shaft 61. The arrangement is such that, referring to FIG. 6, up and down motion of slotted disc 71 between its full and broken line positions, will cause the levers to swing back and forth about their respective fulcrums 75 and 79 and reciprocate the shaft 61 right and left.

The length of stroke of the wheel W may be adjusted from zero to a maximum by changing the inclination of the slot of disc 71, by turning it on slide 68 about its axis 82. Such turning is effected by movement of a tubular piston 83 in a cylinder 84 in the slide, the piston having rack teeth 85 meshing with a segmental pinion 86 affixed to the disc. A piston-rod 87 concentric with and slidable in the piston 83 has a lower end face adapted for engagement with one crank roller 67, the other crank roller 66 being engageable with a shoe 88 on slide 68. The upper end of the piston-rod 87 is adapted to abut a shaft 89 which is journaled in bracket 39 and has a bevel gear 90 meshing a pinion 91 which may be rotatably adjusted manually by the use of a suitable wrench. Splined to shaft 89 is a nut 92 that is screw-threaded onto the upper end of piston 83.

In the condition shown in FIGS. 3 to 6, the shaft 61 and wheel W are in their limit positions to the left (regarding left as in FIGS. 1 and 6) which is the cutter-loading and the dressing position wherein the end of the shaft is against an abutment 93 on bracket 39. In this condition the slide 68 is entirely free of the crank rollers 66, 67. This condition is achieved by applying hydraulic pressure through a passage 94 to cylinder chamber 95, which lifts the piston 83 and rotates pinion 86 until its shoulder 96 abuts face 97 of slide 68, thereby turning the slot of disc 71 to its maximum inclination from the vertical. The pressure simultaneously acts between slide 68 and piston-rod 87 (whose diameter is greater above than below flange 98) to cause the piston-rod to abut shaft 89 and the slide 68 to be moved downwardly to its limit position wherein the disc-and-lever assembly 71, 74, 78 has moved the shaft 61 against abutment 93.

In normal operating condition the hydraulic pressure through passage 94 is shut off and pressure is applied through passage 99 to cylinder chamber 101. This pressure urges piston-rod 87 downwardly to its lower limit position in slide 68, wherein the crank rollers are confined between the lower end of the rod and shoe 88, and urges piston 83 downwardly until the nut 92 abuts the head 102 of cylinder 84. The length of this stroke, which is adjustable by turning pinion 91 as before described, determines the inclination of the slot in disc 71 and hence the stroke of wheel W.

FIGS. 8 to 12 relate to the mechanism for effecting the feed motion of the wheel W about axis 42. This mechanism includes face cams 111 and 112, which are respectively employed for right hand and left hand cutters and which respectively have concave and convex surfaces engageable by a follower roller, the concave surface of cam 111 being engageable by roller 113 and the convex surface of cam 112 being engageable by roller 114. The cams are shiftable as a unit axially on their drive shaft 115 by shifter roller 116 carried by a lever 117 which is operated through a link 118 by hand lever 119, FIG. 2. The cam follower rollers are mounted on rod 121 which is reciprocable axially on bearings 120 in bracket 39. A guide roller support 122 is pivoted to the rod for reciprocation therewith, and carries a guide roller 123 engageable in a guide slot 124 or 125 (depending upon whether the cutter is of right or left hand) in arm 126 affixed to shaft 61. Support 122 is urged counterclockwise (in FIG. 8) around rod 121 by a spring-backed plunger 127 to a limit position, determined by abutment 128, wherein the guide roller 123 is engaged in the slot. A roller 129 engaging face 130 of the arm is supported by a lever 131 that is urged counterclockwise about its fulcrum 132 by a spring 133. The function of this spring is to maintain the follower roller 113 against the cam 111. A spring-and-roller device similar to 129, 131, 133 acts against face 130-A of arm 126 when guide roller 123 is engaged in slot 125, to maintain follower roller 114 against cam 112.

The feed cam assembly 111, 112 is oscillated by means of an adjustable-speed reversing motor and reduction gearing (not shown) connected to shaft 115, and causes alternate infeed and return motions of the shaft 61, and of wheel W carried by it, in the manner shown in FIG. 12, as the stroking motion of the wheel proceeds. The portion of the cam, 111 or 112, which oscillates beneath the follower roller for rough sharpening is that between point 134 on rise 135 and point 136 on dwell 137; for a "float" sharpening after the rough sharpening is that between point 138 on rise 135 and point 136; and for finish sharpening is that between point 139 at the beginning of rise 141 and terminal point 142 of relief 143, this finishing portion including dwell 144. The angle of oscillation of the cam assembly is determined by motor reversing switches 145, one for each of points 134, 136, 138, 139 and 142. The switches are operated by cams 146 on shaft 115. The cam 146–A, for the switch 145–A which effects motor reversal at point 134, is adjustable on shaft 115, upon loosening of clamp 147, to adjust the point 134 to different positions on the rise 135. By this adjustment of the switch means the stroke of the infeed may be readily varied to enable the cutter blades to be sharpened back by only whatever amount appears to be necessary from an examination of the cutting edges made before sharpening of a particular cutter is begun. The switches are included in the control system of the machine which is so organized that the withdrawal of the grinding wheel in direction 38 to permit indexing of the cutter is effected by means shown in FIG. 15 (and described hereinafter) during the return motion of the cam 111 or 112 while the dwell 137 is effective, in the case of rough sharpening or float sharpening, and while the relief 143 is effective, in the case of finishing sharpening.

When the grinding wheel W is to be dressed the guide roller 123 is lifted in slot 124 or 125 free of contact with the slot walls and a lock dog 148 is engaged in the slot with such walls to accurately establish the dressing position. This is accomplished by applying hydraulic pressure to the upper face of piston 149, FIG. 10, which is reciprocable in a cylinder on bracket 39. The rod of the piston is pivoted at 151 to the lock dog, and hence the latter is pressed into the slot. Simultaneously an abutment 152 on the piston rod engages a lug 153 on roller support 122 and pivots the latter, clockwise in FIG. 8, against the resistance of spring 127 to lift the guide roller 123. At the conclusion of wheel dressing, pressure is applied to the lower face of this piston, so that the lock dog is lifted to its uppermost position wherein surface 154 thereof engages roller 155 on support 122, and the guide roller 123 is re-engaged in slot 124 or 125.

When the arm 126 is to be adjusted about axis 42, for sharpening a cutter of the opposite hand, the piston 149 is lowered and a gear segment 156, FIG. 10, is turned by means of hand wheel 157, FIG. 2, to rotate a pinion 158 which is fast on a pin 159 that is rotatable in bracket 39. The lock dog 148 is pivoted on an eccentric journal on this pin, so that when the pin is turned the pivot axis 161 of the lock dog is lowered, causing the dog to fulcrum about pivot 151 completely clear of slot 124 (or 125). Now upon manual turning of shaft 61 and arm 127, the roller 123 will be cammed out of the slot and into the other slot 125 (or 124).

FIGS. 13 and 14 show the mechanism by which the wheel feed and return motions 45, FIG. 2, are accomplished. In the wheel head 43 is journaled the spindle 171 on either end of which the wheel W may be mounted. The wheel head is supported on ball-sleeve bearing 172 for motion in wheel head support 41 in direction 45, perpendicular to axis 44 of the spindle. Prior to each wheel dressing operation a ratchet mechanism is operated to lower the wheel in direction 45 by a predetermined distance. This ratchet mechanism comprises a piston 173 movable in one direction in a cylinder in the wheel head support by hydraulic pressure applied to cylinder chamber 174, and in the return direction by a spring 175 when this pressure is released. A pawl 176 pivoted at 177 to the piston is urged by a spring 178 into engagement with a ratchet wheel 179. Upon return motion the pawl engages a stud 181 and is thereby pivoted out of engagement with the wheel 179. The latter has secured thereto a nut 182 which is threaded onto a screw 183 secured to the wheel head 43. To eliminate backlash between the nut and screw, and to frictionally prevent unintentional retrograde motion of the ratchet wheel when the pawl is released, a nut 184 also threaded to the screw is keyed to the nut 182 for axial motion relative thereto, and a spring washer 185 is disposed between the two nuts to urge them apart. When the limit of downward wheel feed has been reached, and the wheel W is to be replaced, upward return motion of the wheel head 43 may be effected by manually turning the ratchet wheel and nut assembly by means of a wrench applied to socket 186 of the ratchet wheel.

FIG. 15 illustrates the mechanism for effecting the motions 38, FIG. 2, for vertical adjustment of the grinding wheel W and for elevating it to permit indexing the cutter, mounting and removal of the cutter, and dressing of the wheel. A cylinder member 191 is secured to the column 36 and slidable in the cylinder bore there is a piston 192 having at its upper end a flanged nut 193 adapted to seat on a ring 194 supported by cylinder head 195. The nut is threaded to a screw 196 journaled for rotation in a radial and axial thrust bearing 197 secured to the bracket 39. On screw 196 is a bevel gear 198 meshing with a pinion 199 rotatable in the bracket. By manual rotation of the pinion, by means of a suitable wrench, the bracket may be raised or lowered to bring the periphery of the wheel into tangency with reference plane 55, FIGS. 1 and 2. A cover 201 which telescopes over the column 36, is movable as a unit with the bracket. An annular piston 202 in the cylinder is slidable on the piston 192 and is adapted for abutment by shoulder 203 of the latter. Slidable in the piston 192 is a tappet 204 urged downwardly relative to the piston by a spring 205, the bottom of the tappet being adapted to ride on a cam or ring on a shaft 206 which is rotatable and also axially shiftable in the column 36. The tappet is shown as seating on a ring 207 concentric with shaft 206, but by manually-effected axial shifting of the shaft, to the left, a cam 208 secured on the shaft may be brought beneath the tappet. Also secured to the shaft is a ratchet wheel 209.

By application of hydraulic pressure through lines 210 and 211 to cylinder chambers 212 and 213, piston 202 is held in its down limit position shown, and piston 192 is elevated until its shoulder 203 abuts piston 202. This elevates the bracket 39 to indexing position, wherein the wheel W is clear of the cutter being sharpened. By release of pressure from line 210, pressure in chamber 213 will further raise the piston 192 and cause it to lift the piston 202 into abutment with cylinder head 195. This elevates the bracket 39 to the position wherein a cutter may be loaded or unloaded and wherein the wheel W is dressed. From either elevated position the piston 192 is lowered by placing line 211 on exhaust and applying pressure through line 214 to chamber 215. Lowering is rapid throughout most of the stroke because spring 205 has lowered the tappet 204 relative to the piston, so that land 216 of the tappet allows fluid exhaust through port 217 in the piston and passage 218 to line 211, but is slowed when the tappet abuts and is arrested by ring 207 (or cam 208). This shifts the piston relative to the land, to close off port 217 and cause the exhaust from chamber 213 to be through a flow restrictor 219. A check valve 221 is closed throughout lowering of the piston but is open while the piston is being elevated.

Ring 207 is utilized to limit the down motion of the grinding wheel in the case of cutters to be sharpened to a constant depth. In other instances, where different blades around the cutter are to be ground to different depth, a cam 208 especially designed for such cutter is utilized. By means of ratchet wheel 209 and an actuator for it operating in time with the index means for the cutter spindle, the rotation of the cam 208 is correlated with indexing rotation of the cutter. The ratchet wheel actuator may be generally similar to that shown in FIG. 13, and be hydraulically connected to the actuating piston of the cutter spindle index mechanism, described hereinafter.

The dressing mechanism for the grinding wheel and its relation to other parts of the machine is the subject of our Patent No. 3,086,508, granted April 23, 1963, on a division of this application. The dressing mechanism appears only partially in FIGS. 1 and 2, and is shown in detail in FIGS. 16 to 18. It comprises a diamond-impregnated dresser wheel 231 having a cylindrical surface 232 for dressing the conical face 32 of wheel W as shown in full lines in FIG. 16 and a concavely radiused surface 233 for dressing a convex edge radius on the wheel as shown in broken lines in the same view. The dresser wheel is journaled for rotation in a dresser arm 234, and is driven by a motor 235 mounted on bracket 39, the drive being through a flexible cable 236 encased in a flexible sheath 237, a bevel pinion 238 journaled in arm 234, and bevel gear 239 rotatable as a unit with the wheel. Arm 234 is secured to a piston rod 241 journaled on ball-sleeve bearings 242 for both angular and axial motion in a cylinder housing 243. A piston 244 affixed to the rod is movable axially by means of hydraulic pressure alternately applied to chambers 245 and 246. This motion is limited by abutment of end flange 247 of the piston rod with stop 248 and cylinder head 249.

An internal gear segment 251 secured to the piston rod 241 meshes with a pinion 252 rotatable on a stub shaft 253 affixed to the cylinder housing 243. Also meshing with the pinion is a rack 254 on the rod of a piston 255. The latter is reciprocated by alternate application of hydraulic pressure to chambers 256 and 257 to respectively swing the arm 234 up and down about axis 256 of piston rod 241, the limit positions being determined by abutment of the piston 255 with cylinder heads 258 and 259.

The dressing is accomplished by the two wheels W and 231 being motor driven, at different peripheral speeds. To begin dressing the wheel stroking mechanism is brought to dressing position by the application of pressure to chamber 95, FIG. 5, the lock dog 148, FIG. 10, is engaged by action of piston 149, and the wheel W is raised as a unit with bracket 39 to dressing position by hydraulic pressure applied through lines 210 and 211, FIG. 15. By application of pressure to chamber 257, FIG. 17, the dresser wheel 231 is lowered. Ratchet wheel 179, FIG. 13, is advanced one pitch by application of pressure to chamber 174, to feed the wheel downwardly in direction 45, FIGS. 2 and 14; and the dresser wheel 231, in its lower, broken line position in FIGS. 16 and 17, is shifted to the left in FIGS. 16 and 18 by pressure applied to chamber 246, to thereby dress the edge radius of the wheel W. This motion is such that the dresser wheel axis 261 as viewed in FIG. 16 shifts from the right side of the vertical plane through axis 42 to position 261' to the left of said plane. The dresser wheel is then returned, to the right, by pressure applied to chamber 245, and then is raised, by pressure applied to chamber 256, to dress the conical surface 32 of wheel W. Pressure is released from chamber 174, FIG. 13, causing reset motion of pawl 176, and the bracket 39 is lowered by piston 192 to bring the wheel W to the reference plane 55, FIG. 1. When the wheel is in position W', FIGS. 2 and 16, for sharpening a left hand cutter, the dressing action is the same, except that application of pressure to chambers 245 and 246, FIG. 18, is reversed, so that the edge radius of the grinding wheel is dressed by motion of the dresser wheel to the right. That is, as viewed in FIG. 16, the dresser wheel axis shifts from position 261' to position 261.

At the conclusion of dressing the wheel stroking mechanism is returned to operating condition by lowering of pistons 83 and 87, FIG. 5; the lock dog 148, FIG. 10, is raised and roller 123 lowered by piston 149, FIG. 10; and the bracket 39 and wheel W are lowered to grinding position, wherein the wheel periphery touches plane 55, by piston 192, FIG. 15.

Referring to FIGS. 19 to 21, the cutter spindle housing 51, in which spindle 52 is mounted on anti-friction bearings, is slidable on cylindrical surface 270 of cutter head 48 for its adjustment along and about spindle axis 53. The means for adjustment of the housing on this surface, along the spindle axis, to bring the tip plane of the cutter C to the design distance from axis 49 determined by the previously described gauge, includes a stub shaft 271 manually rotatable in head 48 by means of a suitable wrench, the shaft having an eccentric portion on which is pivoted a block 272 that is slidable in a transverse slot in the spindle housing. After such adjustment the stub shaft is secured to head 48 by means of a manually applied screw clamp 273. The means for adjustment about axis 53 comprises a screw 274 manually rotatable by means of a wrench, the screw having keyed thereto for axial motion and co-rotation a calibrated dial 275, and also having a screw threaded portion 276 that is threaded onto a rack 277 meshing with gear teeth 278 on housing 51. A pin 279 is secured to the screw and engaged in an elongated slot in a tubular screw 281, to cause the latter to rotate as a unit with screw 274 but to have limited axial motion relative thereto. The tubular screw is held against axial motion by thrust plates 282 secured to head 48 and is screw-threaded at 283 to a nut 284 secured to a rack 285 which also meshes with the gear teeth 278. Both racks are slidable axially of the screw in the head 48. After the angular adjustment has been made, a nut 286 that is threaded onto screw 274 is tightened, thereby drawing the screw 274 upwardly in FIG. 20 relative to tubular screw 281, thereby taking up backlash between the screws, racks 277, 285 and gear 278. The reaction from nut 286 is transmitted to the cutter head 48 through dial 275.

The cutter head 48 is rigid with a stub shaft 287, FIGS. 19 and 22, which is supported in the bracket 46 on anti-friction bearings 288 to provide for adjustment of the head about axis 49. The means for effecting such adjustment comprise a pinion 289, FIGS. 22 and 23, on the stub shaft and a pair of telescoping racks 291, 292, FIG. 24, whose teeth mesh with the pinion. The racks are slidable in a bore in bracket 46 and upon each other, but are held against relative rotation by a pin 293. They are secured to nuts 294, 295, respectively, that are threaded to a screw 296 and the screw-threaded stem of a tubular piston 297, slidable in a cylinder in the bracket. The screw and the piston are relatively movable axially but are connected for co-rotation by a pin 298. Screw 296 is splined to a shaft 299 to which a calibrated dial 301 is secured. By turning the dial the racks are adjusted along the screw, and after such adjustment the shaft 299 may be secured to the bracket 46 by a clamp nut 302.

On the opposite end of screw 296 there is a piston 303 slidable in the tubular piston 297 and adapted to abut the head of a stop nut 304 which is slidable but nonrotatable in bracket 46. By manual rotation of a screw 305 bearing a calibrated dial 306 the nut 304 may be adjusted axially. It may then be secured to the bracket by means of a clamp nut 307 threaded to the screw 305.

The arrangement is such that by application of hydraulic pressure to cylinder chamber 308 the tubular piston is moved to the left in FIG. 23 until it abuts cylinder end wall 309, moving the racks 291, 292 to a limit position determined by adjustment of dial 301, thereby swinging the cutter head counterclockwise, in FIGS. 2 and 23, about axis 49 to establish a first sharpening angle to which the cutter C may be sharpened. The application of pressure to chamber 308 urges continued motion to the left of piston 303 and screw 296 relative to piston 297, and takes up backlash between piston 297 and nut 295, screw 296 and nut 294, and racks 291 and 292 and pinion 289. Release of hydraulic pressure to chamber 308 and application of it to cylinder chamber 310 will swing the cutter head clockwise, to establish a second sharpening angle to which the cutter C may be sharpened. This position will occur when piston 303 abuts nut 304, in a position determined by adjustment of calibrated dial 306, and then, by further motion to the right of piston 297, backlash is eliminated between the support or bracket 46 and the screws 296, 297, between the latter and the nuts 294, 295, and between the racks 291, 292 and the pinion 289. In both instances the hydraulic pressure to take up backlash is maintained while the cutter C is being sharpened to the selected rake angle. The reversal of hydraulic pressure and exhaust connections to cylinder chambers 308 and 310 is by means of a manually operable valve, 311 in FIG. 2, and enables the cutter head to be swung about axis 49 between two positions of sharpening angle adjustment, without disturbing the adjustment settings of dials 301, 306 (screws 296, 305).

Referring to FIG. 22, the cutter head bracket 46 is adjustable on frame 30 about axis 47 on anti-friction bearings 312. This adjustment is effected manually by means of a screw 313 carrying calibrated dial 314. By a screw-and-nut action, rotation of the dial moves racks 315, 316 which mesh with a gear 317 on the bracket. After adjustment the screw is clamped and backlash taken up by means of nut 318. This adjustment and backlash take-up is the same in principle as that shown in greater detail in FIG. 20.

FIG. 25 shows the means for adjusting the slide 34 longitudinally on the frame 30 and for effecting the offset adjustment 37 (see also FIG. 2). Slide 34 has on the bottom thereof rack teeth 321 engaged by a pinion 322 fixed to a shaft 323 journaled in the frame and having thereon a worm wheel 324 meshing a worm 325 on a shaft 326 to which is attached a hand wheel 327, FIGS. 1 and 2. After adjustment of the slide, by turning the hand wheel, the slide is clamped to the frame by suitable means, not shown. The offset adjusting means includes a pair of nuts 328 threaded onto a screw 329 and secured to column 37 in such spaced relation to each other as to eliminate backlash. One end of the screw is splined to a gear 331 journaled for rotation in slide 34 and meshing a pinion on one end of a telescoping shaft 332 on whose opposite end, FIG. 2, a wrench socket, a calibrated dial 333 and a clamp nut are provided.

On the opposite end of screw 329 there is a piston 334, slidable in a cylinder 335 secured to the slide 34. The stroke of the piston is limited by cylinder head 336 and by a stop screw 337 that is threaded to the cylinder body and splined to a gear 338. The gear is rotatable in axial thrust bearings 339 and meshes a pinion on one end of a telescoping shaft 341 whose opposite end, FIG. 2, is provided with a wrench socket, a calibrated dial 342, and a clamp nut. By application of hydraulic pressure to cylinder chamber 343 the piston 334 is held in its limit position to the left, shown in FIG. 25, so that the column will be in a first position of offset adjustment selected by turning shaft 332 and dial 333. By release of this pressure and application of pressure to cylinder chamber 344, piston 334 is moved to the right, carrying the column 36 to a second position of offset adjustment that is selected by turning shaft 341 and dial 342. Thus by reversal of the hydraulic pressure and exhaust connections to chambers 343 and 344, by manually operable valve 345, FIG. 2, the column 36 may be moved back and forth between two positions of adjustment, without disturbing the adjustment settings of screws 332 and 341 and dials 333 and 342.

The utility of the sharpening angle and sharpening offset set-overs accomplished by valves 311 and 345 will appear from FIGS. 26 and 27. With the valves in one position the cutter may first be rough sharpened to produce on each blade the face 33–A of one sharpening offset angle, and then, with the valves in opposite position, may be finish sharpened to produce a narrow face 33–B of a smaller sharpening offset angle extending along the cutting side edge of the blade, to thereby eliminate burrs from the edge, and also to make possible highly accurate spacing of the finish sharpened cutter blades. This latter effect is due to the very small areas of the faces 33–B which results in a minimum of wear of the grinding wheel while these faces are being ground. The edge, which is at 351 after the finish sharpening, is at 352 after only the rough sharpening. In the case illustrated, edge 351 is of zero hook angle, i.e. lies in a plane 353 containing the cutter axis. The edges of faces 33–A and 33–B at the tipe of the blade are designated respectively 354 and 355. FIG. 27 shows only the tip portion of the blade, bounded on the bottom by a plane of cutter rotation which intersects faces 33–A and 33–B respectively along lines 356 and 357. The angles which these lines form with cutter axial planes containing edges 352 and 351 respectively are designated RA and RB respectively, and are the side rake angles of the two faces.

The section-line projections A and B in the lower part of FIG. 27 are in planes 358 and 359, respectively, which are perpendicular to lines 356 and 357. Angle SB is the inclination, in plane 359, of face 33–B relative to the cutter axial plane containing edge 351; and angle SA is the inclination in plane 358 of face 33–A to the corresponding axial or near-axial plane containing edge 352.

Angles SA and SB are the sharpening angles determined by the adjustment of the cutter head about axis 49. The blade hook angle in the case of a face mill cutter, i.e. the angle between a projection of the cutting edge and a projection of the cutter axis onto a plane perpendicular to a radial line extending from the cutter axis to a mean point on the cutting edge, is a function of both the sharpening angle, SA or SB, and the sharpening offset angle. The latter, which is a function of rake angle and the sharpening angle, SA or SB, closely approximates the rake angle, RA or RB, when the sharpening angle is small.

The face 33–A is brought into the vertical plane which the conical face of grinding wheel W traverses by establishing the selected angles SA and RA through adjustment of dials 301 and 333, the dial positions being precalculated from the design data for the particular cutter to be sharpened. The angles SB and RB, similarly determined, are established by the adjustment of dials 306 and 342. Set-over from angles SA and RA to SB and RB, and return, is effected by actuation of valves 311 and 345 without disturbing the setting of dials 301, 306, 333 and 342. Thus by actuating the valves 311 and 345 the machine operator is enabled to quickly and conveniently make the set-overs necessary to rough sharpen faces 33–A and finish sharpen surfaces 33–B of a succession of cutters of the same design.

The magnitude of the sharpening back from edge 352 to edge 351 is greatly exaggerated in FIG. 27. In practice this distance has been very small, ranging from about one to several thousandths of an inch, the differences in angles RA and RB having been on the order of five degrees and the width of face 33–B on the order of ten to thirty thousandths of an inch (0.010″ to 0.030″). However the machine will accommodate wide variations in these values, to meet the requirements of a variety of cutters and grinding wheels of various compositions.

Since the set-overs from angles SA and RA to SB and RB disturb the positional relationship between the sharpening plane 54 or 54′ and the sharpening faces of the cutter blades, it is necessary after rough sharpening faces 33–A to readjust the cutter spindle housing 51 angularly in head 48 about axis 53 before sharpening faces 33–B. This may be accomplished by the adjustment means shown in FIG. 20. The magnitude of this readjustment may be determined by trial or, preferably, by precalculation. By a modification of the machine the readjustment by a precalculated amount may be made by hydraulic pressure, simultaneously with the other set-overs.

By such modification the device shown in FIG. 20 for adjusting the pinion 278 and housing 51 in head 48 about axis 53 is replaced by a mechanism substantially like that which is shown in FIG. 23 for adjusting the pinion 289 and shaft 287 in bracket 46 about axis 49. This mechanism includes two racks respectively screw-threaded to two telescoping screws which may be manually rotated to establish a first adjusted position of the pinion and moved in an axial direction, hydraulically, to establish a second adjusted position of the pinion. In FIG. 30, the modified mechanism is shown as comprising a screw 296' which replaces screw 274 of FIG. 20, and corresponds in form and operation to screw 296, shown in detail in FIG. 23, and further comprises a tubular screw having thereon a piston 297', corresponding to piston 297 in FIG. 23, and which replaces screw 281 of FIG. 20. A manually operated shut-off and reversing valve 346 and a manually operated reversing valve 347 are provided in conduits connecting the set-over cylinders to hydraulic pressure and return lines 348, 349. With valve 347 in one position, operation of valve 346 to apply pressure to cylinder chamber 344 will result in pressure being applied also to chambers 310 and 310', causing simultaneous set-over of column 36 to the left and of head 49 clockwise about axis 49 in FIG. 2, and of the cutter spindle housing 51 and cutter C clockwise about their axis 53 in FIG. 22. Subsequent operation of valve 347 to apply pressure to the opposite cylinder chambers 343, 308 and 308' will effect simultaneous return set-overs of the column, head and spindle housing. By reversal of valve 347, the direction of the set-overs effected by pistons 297, 303 and 297', 303' will be reversed relative to those effected by piston 334. By operation of valve 347 the machine may therefore be conditioned for the double-angle sharpening of either right or left hand cutters.

The indexing mechanism, for effecting blade-to-blade advance of the cutter undergoing sharpening, is shown in FIGS. 19, 28 and 29, and is the subject of copending application Serial No. 63,412, filed on even date herewith by E. O. Hediger, now Patent No. 3,030,826, dated April 24, 1962. It includes an index plate 451 detachably secured to the cutter spindle 52 and having around its periphery a number of notches 452, the number equaling or being a multiple of the number of blades to be sharpened on the cutter C. The plate may be interchangeable with others of the same diameter but having different numbers of notches. A locking pawl 453 having a tooth 454 engageable in any one of the notches is pivoted at 455 to the spindle housing 51 and is urged into such engagement by a spring 456. For causing indexing advance of the plate and spindle, an actuating pawl 457 having a tooth 458, which is also engageable in any one of notches 452, is pivoted at 459 to an arm 361. This arm is carried by a segmental pinion 362 rotatably supported by the spindle. A spring-backed plunger 363 constantly urges motion of pawl 457 in a direction to engage tooth 458 with the plate.

For effecting alternate engagement of the pawls 453 and 457 with the plate, there is a lever 364 fulcrumed to the housing by a pin 365. The lever is pivoted to pawl 453 by means of a pin 366 which pivotally supports a block 367 that is slidable in a slot in the pawl. The lever is also pivotally connected to a pawl lifter 368 by means of pivot pin 369 and a block 371 slidable in a slot in the lifter. The latter has a flange 372 extending around a substantial part of the periphery of the plate 451 and is pivoted at 373 to the housing. The end of pawl 457 opposite to tooth 458 has a slot 374 receiving flange 372. The arrangement is such that upon clockwise motion (in FIG. 28) of the lever 364 about fulcrum 365 the tooth 454 of pawl 453 is lifted clear of the index plate and simultaneously the lifter is swung counterclockwise about its pivot 373 to allow motion of pawl 457 clockwise about its pivot 459 to arm 361 and cause tooth 458 to enter a notch 452 of the plate. The spring-backed plunger 363 effects the entry. Upon return or counterclockwise motion of the lever 364 back to the position shown, locking pawl 453 is re-engaged with the index plate and pawl 457 is lifted from such engagement. The index plate is always under the control of one of the two pawls, tooth 458 entering one notch 452 before tooth 454 has fully departed from another, and vice versa.

The pawl-control lever 364 is actuated by a piston 375 reciprocable in a cylinder in a block 376 secured in housing 51, the lever being pivoted to the piston rod by pin 377. An index actuating piston 378 arranged in another cylinder in block 376 is connected to a rack 379 which is slidable in a bore in the block and meshes with segmental pinion 362. Travel of piston 378 downwardly in FIG. 28, which rotates the pinion and arm 361 clockwise, is limited by abutment 381 of arm 361 with an abutment 382 on block 376. Return travel of piston 378 is limited by its abutment with a stop member 383 which is slidable in but keyed against rotation with respect to a bushing 384 that is fixed to housing 51. The stop 383 is threaded to a screw 385 to which a dial 386 is affixed, and also to a tubular screw 387 which is rotatable in but held against axial motion by plates 388 secured to the housing. A pin 389 carried by screw 385 and extending through elongated slots in screw 387 connects the screws for rotation as a unit but permits them limited relative axial motion. By turning screw 385 the stop 383 is adjusted axially to vary the stroke of piston 378, and after such adjustment a clamp nut 391, which is threaded onto the outer end of screw 385, is tightened to move the screw, upwardly in FIG. 28, relative to tubular screw 387, to thereby take up backlash and clamp the stop in its adjusted position. The stroke of piston 378 is so adjusted that the angular motion of arm 361 and pawl 457 about axis 53 will correspond to the desired angle of indexing. For example, if the index plate has seventy-two notches, a notch spacing of 5°, the piston stroke may be adjusted to produce an angular advance of the pawl of 30°, for a cutter of twelve blades, or of 20° for one of eighteen blades, or of 10° for one of thirty-six blades. The abutments 381, 382 limit clockwise travel of arm 361 to the position wherein the notch 452 engaged by tooth 458 of pawl 457 is directly beneath tooth 454 of pawl 453. In FIG. 19 tooth 458 is shown by broken lines 458' in this limit position.

In each index operation suitable valve means, not shown, first direct hydraulic fluid under pressure through port 392 into cylinder chamber 393, moving piston 375 downwardly to release pawl 453 and engage pawl 457. As its downward limit position is approached the piston uncovers port 394, applying fluid under pressure to chamber 395, to thereby lower the piston 378 and cause indexing motion of pawl 457 and index plate 451. Fluid exhaust from chamber 396 beneath piston 378 is through passage 397 and past spring-closed check valve 398 into chamber 399 beneath piston 375, and that from the latter chamber is through exhaust port 401. The terminal part of the indexing stroke is slowed by piston 378 covering port 402 of passage 397, so that the final exhaust of fluid from chamber 396 into passage 397 is through a bleed opening in a spring-closed check valve 403. Upon conclusion of the indexing stroke, the pressure and exhaust connection to ports 392 and 401 are reversed. Thereupon fluid under pressure entering chamber 399 raises piston 375 to the position shown, allowing spring 456 to engage pawl 453 with the index plate and to disengage pawl 457 from the plate. At the conclusion of this stroke the piston 375 uncovers port 404 into passage 397, opens check valve 403, and raises piston 378, thereby effecting return of the pawl 457. Exhaust from chamber 395 is past spring-closed check valve 405 into chamber 393, and thence into port 392. The indexing cycle described is repeated after each blade of the cutter C has been sharpened. Preceding each indexing cycle the bracket 39 is raised to lift the grinding wheel clear of the cutter by application of pressure to cylinder chambers 212 and 213, FIGURE 15, and after indexing the bracket is lowered.

The machine is provided with electro-hydraulic controls, including switches 145, which act in known manner to effect indexing in time with the operation of the reversing motor which drives cam shaft 115, FIGS. 8–10, so that each feed cycle of cam 111 or 112 may be followed automatically by an indexing cycle, and each indexing cycle by a feed cycle, until all the blades of the cutter have been sharpened. It will be understood that this sequence may be interrupted periodically, either manually or automatically, depending upon the control system, for the purpose of re-dressing of the grinding wheel. In the case of single-angle sharpening, where the sharpening face 33 of each cutter blade is ground to a single plane, a typical sharpening sequence may involve, first, rough sharpening all of the blades around the cutter, using the portion of the feed cam between points 135 and 136, FIG. 12, and redressing the grinding wheel when necessary; second, float sharpening all of the blades, using the smaller portion of the cam between points 138 and 136; and third, redressing the grinding wheel and then finish grinding, using the portion of the cam between points 139 and 142. For double-angle sharpening, to provide faces 33–A and 33–B on each blade, the same sequence may be followed except that between the second and third steps the valves 311 and 345 are actuated to effect the set-overs from angles SA and RA to angles SB and RB, FIG. 27.

From the foregoing it will be understood that according to one aspect of the invention the specific machine disclosed comprises frame 30, cutter spindle 52 supported on the frame, grinding wheel W supported by means 39, 62 for movement upon the frame for traversing the sharpening face 33 of a cutter C on the spindle, adjusting means, including parts 296, 289, FIG. 23, 328, 329, FIG. 25, and 277, 278, FIG. 20, whereby relative adjustment may be effected between the cutter spindle and the wheel supporting means to bring them into a first positional relationship wherein a first surface 33–A, FIG. 26, may be ground on the sharpening face, and a shifting mechanism including pistons 334, 297 and 297′, FIG. 30, for effecting relative back and forth motions between the spindle and the wheel supporting means in a plurality of directions, these motions comprising (a) a reciprocation in direction 37, FIG. 1, perpendicular to the sharpening plane 54, (b) an oscillation about axis 49, FIG. 2, which is parallel to the sharpening plane, and (c) an oscillation about spindle axis 53, FIG. 1, to shift them back and forth between said first positional relationship and a second positional relationship wherein a second surface 33–B, FIG. 26, may be ground on the sharpening face. The stroke adjustments of the pistons heretofore described constitute means for independently adjusting the magnitudes of the back and forth motions of the shifting mechanism, which occur simultaneously under the common control of pressure reversing valve 346, FIG. 30. The oscillation about spindle axis 53 by piston 297′ is carried out by rotation of the spindle housing 51 relative to which the spindle is angularly indexed by the means shown in FIG. 28.

Having now described our improved machine, and its operation, we claim as our invention:

1. A cutter sharpening machine comprising a frame, a frusto-conical grinding wheel and means supporting it for rectilinear movement upon the frame in a path perpendicular to its axis, the plane tangent to the conical face of the wheel during such movement constituting the sharpening plane, a cutter head bracket pivotally adjustable on the frame about a first axis perpendicular to said sharpening plane, a cutter head adjustable on said bracket about a second axis perpendicular to said first axis, a housing having a cutter spindle journaled therein for indexing rotation, with the spindle axis perpendicular to both said first and second axes, and means for adjusting said housing in said head in the direction of said spindle axis.

2. A machine according to claim 1 in which the cutter spindle housing is also adjustable angularly in said head about the spindle axis.

3. A cutter sharpening machine comprising a frame, a frusto-conical grinding wheel and means supporting it for rectilinear movement upon the frame in a path perpendicular to its axis, the plane tangent to the conical face of the wheel during such movement constituting the sharpening plane, a bracket pivotally adjustable on the frame about a first axis perpendicular to said sharpening plane, a cutter head angularly movable on said bracket about a second axis perpendicular to said first axis, a reversible power-operated device for effecting such movement, means to adjust the position of the cutter head on the bracket about said first axis in one terminal position of movement effected by said device, means to adjust the stroke of said device, and a cutter spindle supported by the cutter head for indexing rotation, with its rotation axis perpendicular to both said first and second axes.

4. A machine according to claim 3 in which the cutter spindle is journaled for indexing rotation in a housing which is adjustable in said cutter head about the spindle axis.

5. A machine according to claim 4 in which the means for adjusting the spindle housing in said head about the spindle axis comprises a reversible power-operated device for effecting relative movement of said housing and head, means for adjusting the stroke of said device, and means to adjust the position of the housing relative to the head in one terminal position of the movement effected by said device.

6. A cutter sharpening machine comprising a cutter spindle, a housing journaling said spindle for rotation, intermittent indexing mechanism for advancing the spindle about its axis in the housing by predetermined increments, a reversible power-operated device for effecting relative movement of the housing in the head about said axis, means for adjusting the stroke of said device, and means to adjust the position of the housing about said axis relative to the head in one terminal position of the movement effected by said device.

7. A cutter sharpening machine comprising a frame having a bracket thereon, a wheel head support journaled in the bracket for angular motion and for reciprocation in the direction of the axis of angular motion, a wheel head having a grinding wheel spindle rotatable therein about an axis perpendicular to said axis of angular motion, said head being adjustable in said support in a direction perpendicular to said axes, means for effecting said reciprocation, and feed means for alternately effecting a feed motion and return motion of the support about the first-mentioned axis.

8. A machine according to claim 7 in which the spindle is adapted to support a frusto-conical grinding wheel on either end thereof, with the base of the conical frustum outermost, the plane tangent to the conical face of the wheel during said reciprocation constituting the sharpening plane of the machine, said support being adjustable relative to the bracket about the first-mentioned axis through an angle equal to twice the complement of the half-cone angle of the grinding wheel, whereby with the wheel on either end of the spindle the sharpening plane may be made parallel to the sharpening plane when the wheel is on the opposite end of the spindle.

9. A machine according to claim 8 in which the wheel head support has a pair of guide tracks parallel to the first-mentioned axis, and said feed means comprises a roller engageable in either track and movable in a substantially axial direction upon the bracket to effect said feed and return motions, one or the other of said tracks being engageable by the roller respectively when the support is in one or the other of its positions of adjustment about said first-mentioned axis.

10. A machine according to claim 8 in which said feed means is reversible to effect the feed and return motions in either direction about the first-mentioned axis.

11. A machine according to claim 7 in which the wheel head support has a guide track parallel to the first-mentioned axis, and said feed means comprises a roller engageable with said track and movable in a substantially axial direction upon the bracket to effect said feed and return motions.

12. A machine according to claim 9 in which there is a pawl movable on the bracket for engagement with said track, and means connecting said roller and pawl for effecting the disengagement of either one of them from the track and concomitantly effecting engagement of the other one of them with the track.

13. A cutter sharpening machine comprising a frame, a grinding wheel supported for movement on the frame to cause a curved surface of revolution of the wheel to traverse a plane tangent thereto which constitutes the sharpening plane, a spindle for a cutter and a support for the spindle that is adjustable on the frame angularly about a pivot axis perpendicular to the spindle axis and parallel to the aforesaid sharpening plane, and means to adjust the spindle in the direction of its axis relative to said pivot axis.

14. A machine according to claim 13 in which said support for the spindle is also adjustable on the frame about an axis perpendicular to the sharpening plane, to adapt the machine for cutters of different types.

15. A cutter sharpening machine comprising a frame, a bracket supporting a grinding wheel for reciprocation to cause a curved surface of revolution thereof to traverse a plane tangent thereto which constitutes the sharpening plane, said bracket being adjustable on the frame in a direction perpendicular to said plane, a spindle for a cutter and a support for the spindle that is adjustable on the frame angularly about a pivot axis perpendicular to the spindle axis and parallel to said plane, means to adjust the spindle in the direction of its axis relative to said pivot axis, means of adjustable stroke for moving the cutter spindle support back and forth about said pivot axis between two selected positions relative to the frame, and means of adjustable stroke for moving the bracket back and forth on the frame in said direction perpendicular to the sharpening plane between two selected positions.

16. A cutter sharpening machine comprising a frame, a bracket supporting a grinding wheel for reciprocation to cause a curved surface of revolution thereof to traverse a plane tangent thereto which constitutes the sharpening plane, said bracket being adjustable on the frame in a direction perpendicular to said plane, a spindle for a cutter and a support for the spindle that is adjustable on the frame angularly about a pivot axis perpendicular to the spindle axis and parallel to said plane, and means to adjust the spindle in the direction of its axis relative to said pivot axis, said bracket being movable relative to the frame in a direction that is perpendicular to the path of wheel reciprocation, and that is also perpendicular to said direction in which the bracket is adjustable, to move the wheel clear of the cutter for indexing of the latter.

17. A cutter sharpening machine comprising a frame, a slide adjustable in a horizontal direction longitudinally of the frame and a column adjustable on the slide in a perpendicular horizontal direction, a wheel head bracket adjustable vertically on the column, a wheel head support journaled in the bracket for angular motion thereon about an axis extending in said first-mentioned horizontal direction and for reciprocation along said axis, a wheel head having a grinding wheel spindle rotatable therein about an axis perpendicular to the first-mentioned axis and inclined at an acute angle to the horizontal, said head being adjustable in said support in a direction perpendicular to both of said axes, a cutter head bracket adjustable in the frame about an axis beneath the wheel spindle head and extending in said perpendicular horizontal direction, a cutter head adjustable on the cutter head bracket about an axis perpendicular to the last-mentioned axis, a cutter spindle rotatable in a housing which is adjustable in the cutter head along and also about the axis of the cutter spindle, the latter axis being perpendicular to both the adjustment axis of the cutter head bracket and the adjustment axis of cutter head.

18. A cutter sharpening machine comprising a frame having a bracket thereon, a wheel head support carrying a frusto-conical grinding wheel, said support being mounted on the bracket for angular motion about an axis perpendicular to the grinding wheel axis and also for reciprocation in the direction of the axis of angular motion, a feed cam having a rise for effecting said angular motion for infeed of the conical surface of the wheel and a dwell following said rise to cause the wheel to grind at a predetermined feed depth, a reversible motor for operating said cam for such infeed and dwell and also for return motion following said dwell, and switch means operable in time with the cam to effect reversals of the motor, said switch means being adjustable to adjust the point on said rise at which the return motion of the cam is terminated, to thereby adjust the stroke of the infeed.

19. A cutter sharpening machine comprising a frame, a cutter spindle supported on the frame, a grinding wheel and means supporting it for movement upon the frame for traversing a face of a cutter on the spindle in a plane tangent to the wheel which constitutes the sharpening plane, adjusting means whereby relative adjustment in a plurality of directions may be effected between the cutter spindle and the wheel supporting means to bring them to a first positional relationship wherein a first surface may be ground on said face of the cutter, and a shifting mechanism for effecting relative back and forth motions concomitantly in a plurality of directions between the spindle and the wheel supporting means, including oscillation of the spindle about its axis, to shift them back and forth between said first positional relationship and a second positional relationship wherein a second surface may be ground on said face of the cutter.

20. A machine according to claim 19 in which said shifting mechanism comprises means for effecting relative reciprocation in a direction perpendicular to the sharpening plane of the grinding wheel and further comprises means for effecting relative oscillation about an axis parallel to said sharpening plane.

21. A machine according to claim 19 in which said shifting mechanism comprises means for effecting relative reciprocation in a direction perpendicular to the sharpening plane of the grinding wheel, and further comprises means for effecting relative oscillation about the axis of the cutter spindle.

22. A machine according to claim 19 in which the shifting mechanism includes means for adjusting independently the magnitudes of each of said back and forth motions.

23. A machine according to claim 19 in which the shifting mechanism includes power operated means for effecting said back and forth motions in different directions substantially simultaneously.

24. A machine according to claim 19 in which the shifting mechanism comprises a separate hydraulically actuated piston for effecting the back and forth motion in each direction.

25. A machine according to claim 24 in which there is a common control for reversing the application of pressure to the pistons whereby the back and forth motions may be effected simultaneously.

26. A machine according to claim 19 in which the cutter spindle is journaled in a spindle housing supported by the frame, there is a means for angularly indexing the spindle relative to the housing to bring successive blades of a cutter on the spindle into sharpening position, and said shifting mechanism includes, for one of said back and forth motions, a means for effecting angular motion of said housing relative to the frame about the axis of the spindle.

References Cited in the file of this patent

UNITED STATES PATENTS

| | | |
|---|---|---|
| 1,862,840 | Bullock et al. | June 14, 1932 |
| 1,917,504 | Curtis | July 11, 1933 |
| 2,164,212 | Le Blond | June 27, 1939 |
| 2,238,064 | Kraus | Apr. 15, 1941 |
| 2,473,670 | Wilson | June 21, 1949 |
| 2,555,852 | Hawley | June 5, 1951 |
| 2,828,583 | Carlsen et al. | Apr. 1, 1958 |